Nov. 22, 1955 E. V. BERGSTROM 2,724,190
APPARATUS FOR CONTINUOUSLY DRYING GRANULAR SOLIDS
Filed March 22, 1952 4 Sheets-Sheet 1

INVENTOR.
Eric V. Bergstrom
BY
AGENT

Nov. 22, 1955 E. V. BERGSTROM 2,724,190
APPARATUS FOR CONTINUOUSLY DRYING GRANULAR SOLIDS
Filed March 22, 1952 4 Sheets-Sheet 3

INVENTOR.
Eric V. Bergstrom
BY
Andrew L. Fabvriault
AGENT

Nov. 22, 1955   E. V. BERGSTROM   2,724,190
APPARATUS FOR CONTINUOUSLY DRYING GRANULAR SOLIDS
Filed March 22, 1952   4 Sheets-Sheet 4

INVENTOR.
Eric V. Bergstrom
BY
Andrew L. Laboriault
AGENT

United States Patent Office 2,724,190
Patented Nov. 22, 1955

2,724,190

APPARATUS FOR CONTINUOUSLY DRYING GRANULAR SOLIDS

Eric V. Bergstrom, Short Hills, N. J., assignor to Socony Mobil Oil Company, Inc., a corporation of New York Application March 22, 1952, Serial No. 278,060

3 Claims. (Cl. 34—57)

This invention is concerned with a process and apparatus for drying granular solids and particularly with a process and apparatus for the efficient drying of granular solids wherein a stripping gas is used to remove the material wetting the solids. Typical of processes to which this invention applies is the continuous percolation of liquid hydrocarbon oils through granular adsorbent solids to remove undesirable impurities in the oil wherein liquid hydrocarbon oil is passed upwardly through a downwardly gravitating bed of granular adsorbent solids, such as fuller's earth, to effect the desired treatment. The used adsorbent is then washed free of liquid oil with a wash solvent and passed to a regeneration zone where the adsorbent is reconditioned for reuse in the treating zone.

It has been found desirable in such processes to dry the adsorbent before passing it to the regeneration zone to prevent undue losses of solvent and high cooling requirements in the regeneration zone. This drying is most efficiently carried out by supplying the wet solids to a boiling bed thereof in a drier, supplying the heat to effect the drying to the boiling bed and passing a stripping gas upwardly through the bed to strip the material wetting the solids, usually organic material, from the solids. A difficulty occurs with this system, however, because the organic material removed, and frequently the stripping gas, are condensible so that after passing through the bed the organic material and stripping gas contact cooler metal parts in the upper section of the drier and condense thereon and drop back into the boiling bed, upsetting conditions therein so that inefficient drying results.

It is a major object of this invention to provide a method and apparatus for drying granular contact material which overcomes the above-described difficulty.

Another object of this invention is to provide, in a system for drying adsorbents of palpable particulate form in a continuous percolation process wherein the heat required is supplied by indirect heat exchange to a boiling bed of the adsorbent and stripping gas is passed therethrough to remove vaporized organic material on the adsorbent, a method and apparatus for drying the adsorbent without undesirable condensation of the organic material or stripping gas in the upper section of the drier. These and other objects will become apparent from the following description of the invention.

This invention discloses a method and apparatus for drying granular contact material wherein a bed of the contact material is maintained in an enclosed drying zone in a state of ebullient motion which resembles a boiling fluid. Wet granular contact material which has vaporizable organic material deposited thereon, generally as a liquid, is supplied to the bed and dried contact material freed of the vaporizable material removed therefrom. Heat transfer tubes are spaced throughout the bed to provide the heat necessary for drying by indirect heat exchange. An inert stripping gas is passed upwardly through the bed at a rate which provides for most efficient heat exchange between the fluid in the tubes and the bed. This stripping gas acts to strip any vaporized organic material from the granular solids. The stripping gas, before removal from the drying zone but after removal from the bed, is heated by indirect heat exchange to a temperature level sufficient to prevent condensation of the stripping gas and vaporized material therein within the drying zone.

The invention will be best understood by reference to the attached drawings, of which Figure 1 is an elevational view showing the arrangement of a continuous lubricating oil percolation system to which this invention may be applied;

All of these drawings are highly diagrammatic in form.

Figure 1:
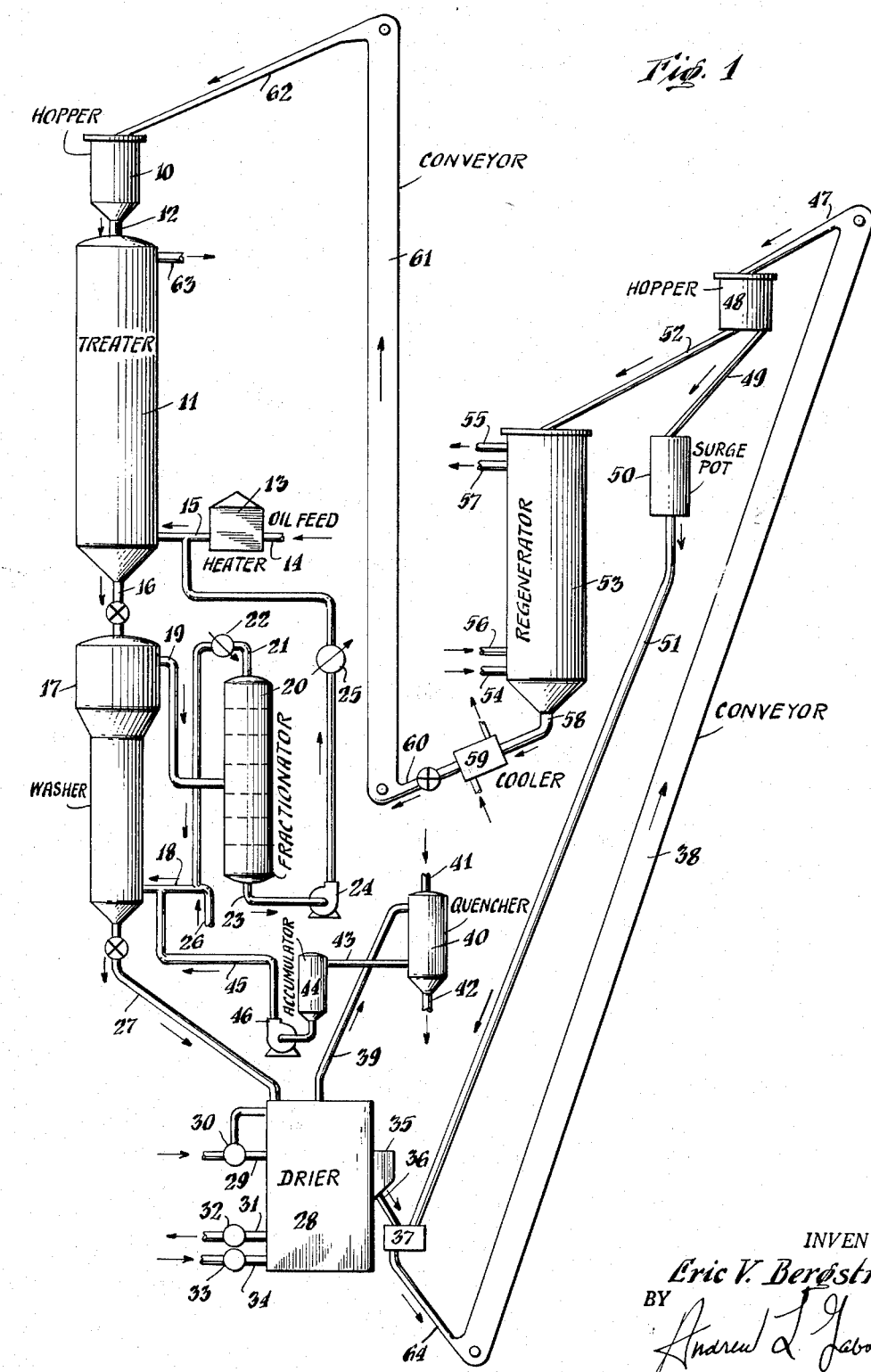
Figure 2:
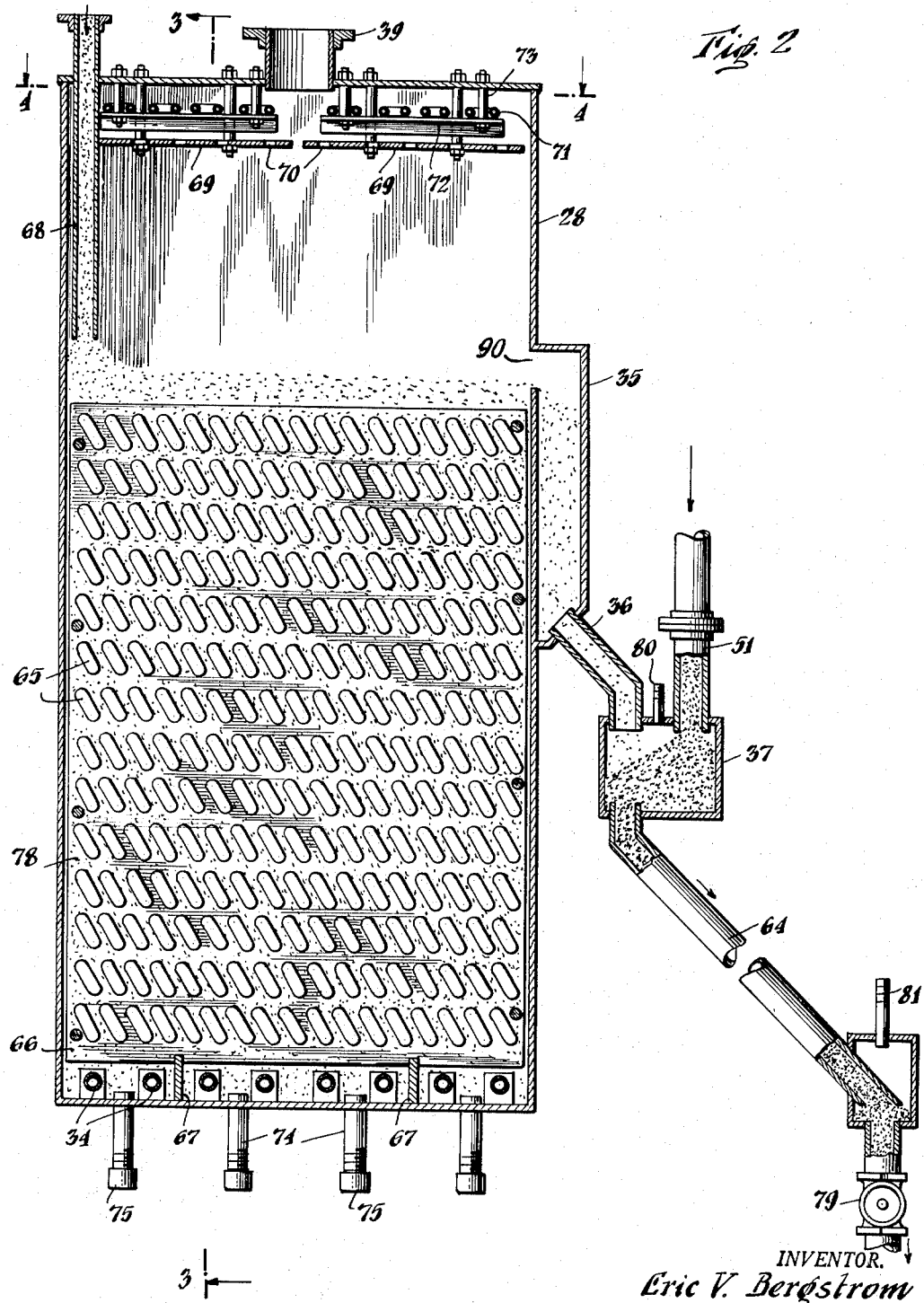
Figure 2 is an elevational view, partially in section, of a suitable drier constructed according to this invention.
Figure 3:
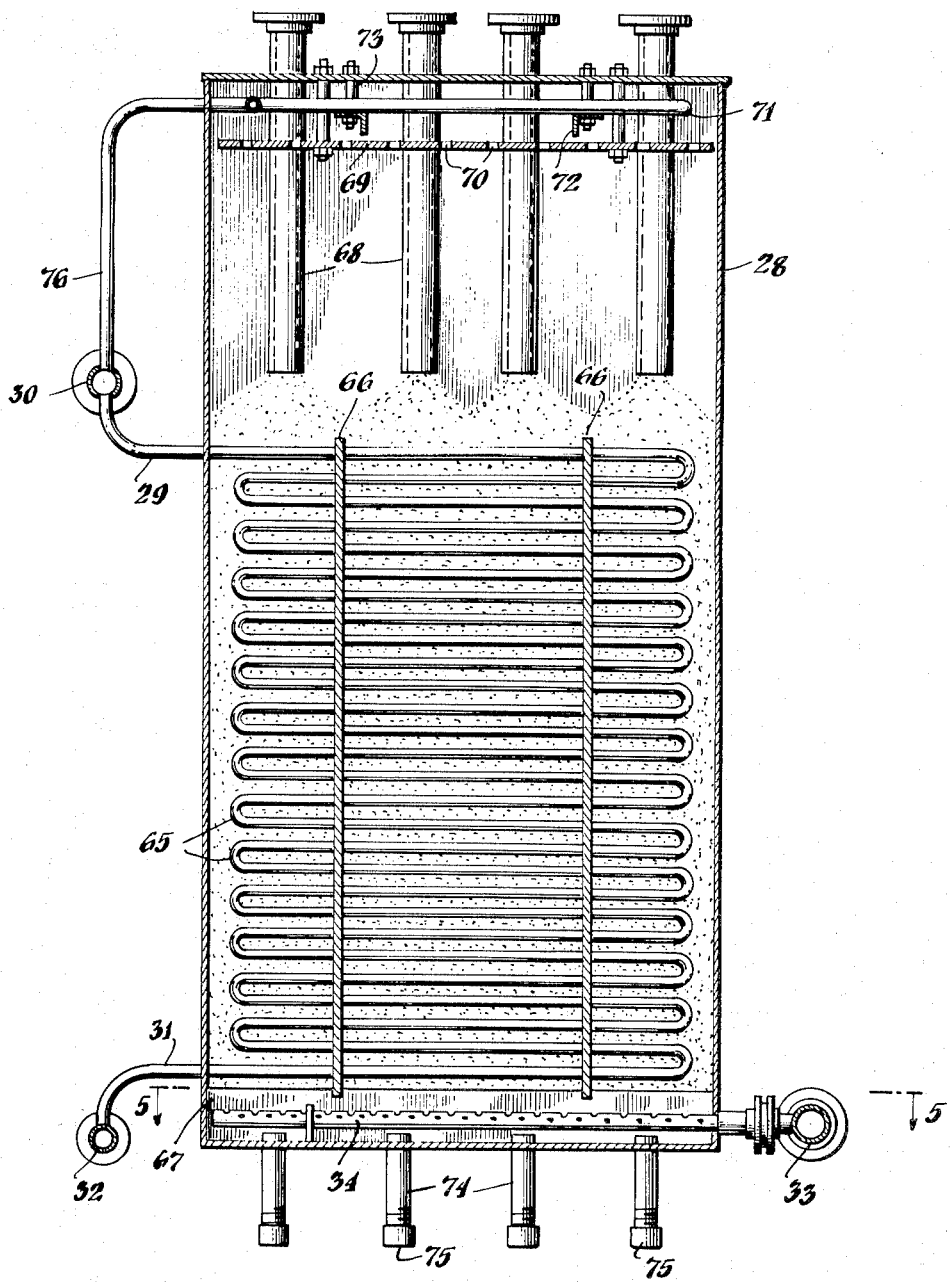
Figure 3 is a sectional view taken along line 3—3 of Figure 2.
Figure 4:
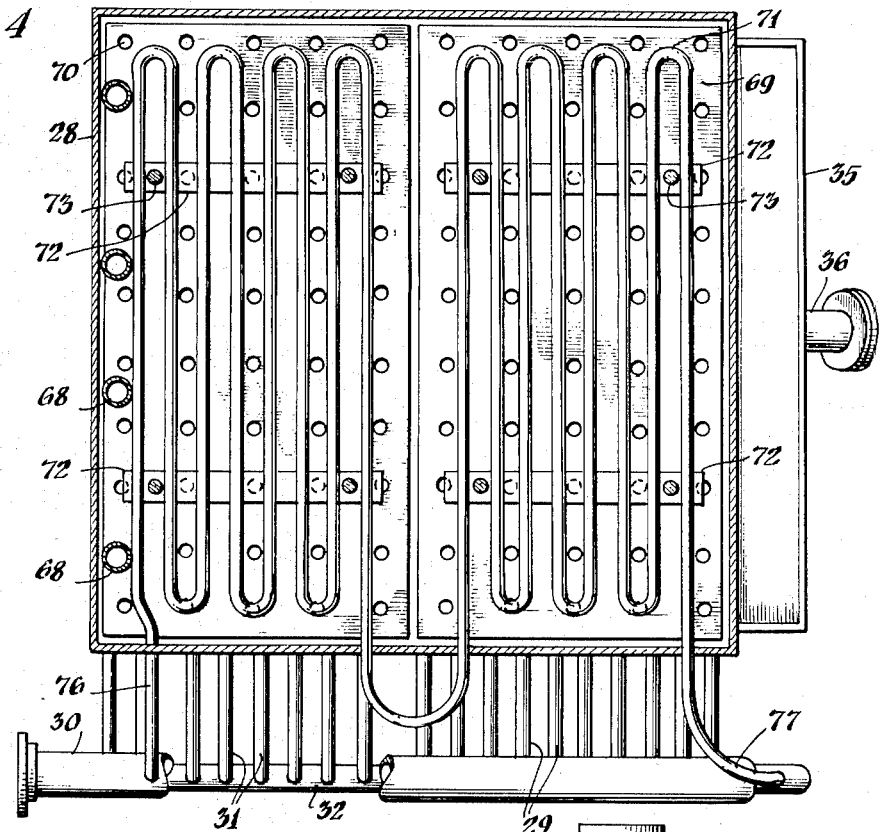
Figure 4 is a sectional view taken along line 4—4 of Figure 2.
Figure 5:
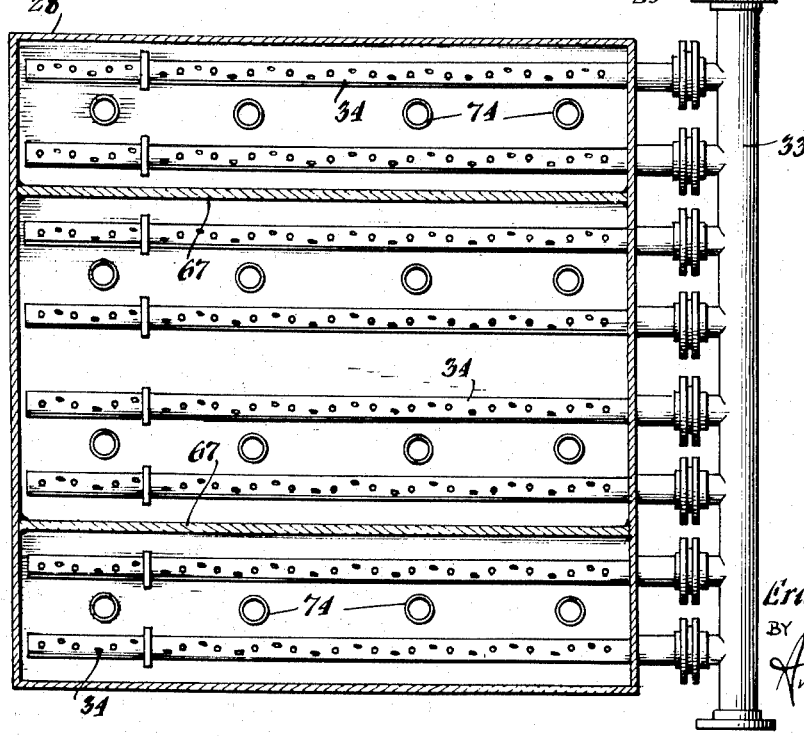
Figure 5 is a sectional view taken along line 5—5 of Figure 3.

Turning to Figure 1, there is shown a typical continuous oil percolation process to which the drier of this invention may be applied. This process is described in detail and claimed in United States patent application Serial Number 177,408, filed August 3, 1950, now Patent No. 2,701,786. In Figure 1 there is shown a supply hopper 10 which connects into the upper end of a treating vessel 11 by means of a conduit 12. An oil feed heater 13 is provided with an oil charge conduit 14 and connects by means of conduit 15 into the lower section of chamber 11. A used contact material withdrawal conduit 16 extends from the bottom of treater 11 into the top of washer 17. Washer 17 is provided with a solvent inlet conduit 18 and a solvent outlet conduit 19. Solvent outlet conduit 19 connects into a fractionator 20 having an overhead withdrawal conduit 21 with condenser 22 thereon. Conduit 21 connects into conduit 18. Fractionator 20 is also supplied with a bottoms withdrawal conduit 23 having a pump 24 and heater 25 and connecting into charge conduit 15. Conduit 26 is provided for the addition of make-up solvent to the system. A contact material withdrawal conduit 27 extends from the bottom of washer 17 into drier 28. Vessel 28 is provided with heat transfer tubes (not shown in this drawing) through which are circulated a heating fluid supplied through conduits 29 from manifold 30. Heat transfer fluid is removed through conduits 31 to manifold 32. Stripping steam is supplied from manifold 33 through conduits 34. A granular adsorbent removal duct 35 is provided on the side of chamber 28 and connects by means of conduit 36 into combining box 37. An adsorbent discharge conduit extends from box 37 into the bottom of conveyor 38. Conduit 39 for the discharge of stripping gas and other gasiform material connects the upper section of vessel 28 with quencher 40. The quencher is provided with a water inlet 41 and a water outlet 42. A solvent discharge conduit 43 extends from the lower section of quencher 40 into the upper section of accumulator 44. Conduit 45 with pump 46 connects the lower section of accumulator 44 with conduit 18 on washer 17. The upper end of conveyor 38 connects, by means of conduit 47, into a hopper 48. Conduit 49 extends from the bottom of hopper 48 into a surge pot 50 which in turn connects, by means of conduit 51, into combining box 37. A second conduit 52 extends from the bottom of 48 into the top of regenerator 53. Regenerator 53 is provided with oxygen-containing gas inlet 54 and flue gas outlet 55. Cooling coils (not shown) are provided within vessel 53 to control the temperature therein below that temperature which will permanently injure the adsorbent. These coils have a cooling fluid inlet 56 and outlet 57.

A regenerated contact material outlet 58 extends from the bottom of vessel 53 into cooler 59 and cooler 59 connects by means of conduit 60 to the bottom of conveyor 61. The top of conveyor 61 connects into hopper 10 by means of conduit 62.

In operation, granular adsorbent contact material gravitates from hopper 10 into the upper section of treating zone 11 through conduit 12. The adsorbent employed should be made up of palpable particles of size within the range about 4-100 mesh and preferably 10-60 and still more preferably 15-30 mesh by Tyler standard screen analysis. The particles may taken the form of pellets, capsules, pills, spheres or the like or granules of irregular shape such as are obtained from grinding and screening. The terms adsorbent or contact material in palpable particulate form and palpable particle form adsorbent or contact material as employed herein in describing and claiming this invention are intended to generically cover particles of any or all of these shapes having substantial size as distinguished from finely divided particles. Typical adsorbents which may be used are fuller's earth, bauxite, bentonite and bone char, charcoal, magnesium silicate, heat and acid activated kaolin, and activated carbon.

The adsorbent passes through contacting zone 11 as a downwardly gravitating columnar mass. A liquid oil feed which may be, for example, a fuel oil or lubricating oil of low asphalt content, passes to heater 13 by means of conduit 14 wherein the oil is heated to a suitable temperature for adsorbent contacting. The heated oil is charged to the lower section of contacting zone 11 by means of conduit 15 and passes upwardly through the adsorbent bed therein to effect the desired treatment. Typical of the purposes for which this treatment may be made are decolorization, neutralization, removal of suspended, colloidal or dissolved impurities such as carbon or coke or oxygen or nitrogen containing impurities and other gum forming compounds and improvement of the demulsibility properties of the oil. The treated oil is removed from the treating zone by means of conduit 63. The used adsorbent bearing a non-vaporizable coky or tar like carbonaceous contaminant deposit and also liquid oily material gravitates from the bottom of zone 11 into the top of washing zone 17. In the washing zone the adsorbent is freed of any adhering liquid oil by countercurrrent contacting with a suitable wash solvent admitted through conduit 18. Typical of suitable solvents are petroleum naphtha boiling within the range 100° F.-400° F., carbon tetrachloride, normal heptane, normal octane and carbon disulfide. A paraffinic naphtha boiling within the range about 210-300° F. is generally preferable. Used solvent, containing dissolved oil, is passed to fractionator 20 by means of conduit 19. In the fractionator, solvent is stripped from the oil and returned to washing zone 17 by means of conduit 21 after condensation. Liquid oil is pumped from the bottom of the fractionator through line 23 and heated by heater 25 to the oil charging temperature. This oil is then added to the charge flowing into treating zone 11. The washed adsorbent bears a non-vaporizable hydrocarbon or carbonaceous deposit and vaporizable organic material, the latter comprising the wash solvent and in some cases small amounts of oily constituents. The washed adsorbent passes from washing zone 17 through line 27 to drying zone 28. In zone 28 the contact material is heated by the heat transfer tubes therein and stripped of vaporized solvent by means of an inert stripping gas introduced through conduits 34. The system of Figure 1 is designed to utilize steam as a stripping gas but other inert gases, such as flue gas, may be used. The steam and vaporized solvent pass out of zone 28 through conduit 29 to quenching zone 40 wherein the steam and organic material stripped from the adsorbent are condensed by cold water admitted through conduit 41. Water and any adsorbent fines carried from zone 28 are removed through conduit 42. Solvent is passed through line 43 to accumulator 44 from which it is returned to washing zone 17 by means of conduit 45. If flue gas or some other inert gas which is relatively more difficult to condense than steam is used, the quenching system may have to be modified to free the stripping gas from the solvent. One method would be to provide a vent at the top of the quencher through which the stripping gas could escape. Dried adsorbent passes from zone 28 through passages 35 and 36 to combining zone 37. Adsorbent is removed from zone 37 through passage 64 at a rate greater than it is supplied through passage 36. Contact material is transported upwardly from conduit 64 to supply hopper 48 by means of conveyor 38. Conveyor 38 may be of any of the forms known in the art such as a bucket elevator or gas lift. From supply zone 48 adsorbent gravitates back to combining zone 37 through conduit 49, surge pot 50 and conduit 51 to make up the difference in flow rates between the streams flowing in passages 36 and 64. A second stream of adsorbent passes from supply zone 48 to the upper section of regeneration zone 53 through conduit 52. The contact material passes through the regeneration zone as a substantially compact mass and is contacted therein by an oxygen-containing gas such as air, admitted through conduit 54. The oxygen-containing gas burns the non-vaporizable contaminant deposit from the adsorbent. Flue gas is removed through conduit 55. Other systems of reconditioning the contact material than that shown in Figure 1 may be used within the scope of this invention. Adsorbent passes from the regeneration zone through conduit 58 and then through cooler 59 wherein the temperature of the adsorbent is reduced to a level suitable for use in the treating zone. Contact material is then supplied to conveyor 61 which elevates the adsorbent to hopper 10.

The details of the drier construction are shown in Figures 2, 3, 4 and 5 which will be considered together. Like parts in all of these figures and Figure 1 bear the same numerals. In these figures there is shown drying vessel 28. Heat transfer tubes 65 are spaced throughout the lower section of chamber 28 from a level immediately above the lower end of the vessel to a level substantially below the top of the vessel and are positioned by tube sheets 66. Tube sheets 66 are supported from the bottom of vessel 28 by supports 67. A plurality of wet contact material supply conduits 68 extend from conduit 27 of Figure 1 into the upper section of drying chamber 28 and along one wall of the drying chamber to a level above tubes 65. A slot type weir 90 extends across the wall of chamber 28 opposite that wall of 28 adjacent to conduits 68 at a level above tubes 65, the point of entry to 90 being laterally displaced from the points of discharge from 68. Passage defining means 35, in the form of a duct or conduit, in conjunction with conduit 36 connect weir 90 with combining box 37. Extending across the upper section of vessel 28 at a level above the lower ends of conduits 68 and above passage defining means 35 is a horizontal baffle plate 69, having a plurality of orifices or short passageways 70 which are uniformly spaced and distributed over the horizontal cross-sectional area of the baffle plate. Above plate 69 are fixed heat transfer tubes 71 which are supported from the top of vessel 28 on angle pieces 72 by bolts 73. A discharge conduit 39 extends upwardly from the upper end of vessel 28. A plurality of perforated pipes 34 extend substantially horizontally across vessel 28 beneath tubes 65. These pipes connect at one end to a stripping gas manifold 33. Each orifice or opening in pipes 34 should be located in the center of, and serve, an equal area of the drier. Broadly each orifice should serve from 4 to 20 square inches of drier cross-sectional area. Preferably each orifice should serve about 16 square inches of area. A plurality of conduits 74 extend outwardly from the bottom of chamber 28. These conduits are used to drain chamber 28 during shutdowns and are normally capped by caps 75. A charge manifold 30 for heat transfer fluid is provided and a plurality of conduits 29 connect this manifold with tubes 65. A conduit 76 also connects manifold 30 with heat transfer tubes 71. A heat transfer fluid discharge manifold 32 is also provided and conduits 31 connect this manifold and heat transfer tubes 65. A conduit 77 connects manifold 32 and heat transfer tubes 71.

In operation a bed of granular contact material 78 is maintained throughout the lower section of drying zone 28 in a state of ebullient motion which resembles a boiling fluid. The upper surface of the bed is maintained a substantial distance below the upper end of the drying zone and the temperature of bed 78 is maintained at a level sufficient to vaporize the vaporizable organic material wetting the contact material by indirect heat exchange with the heating fluid circulating in tubes 65. This temperature should preferably be such that any water retained by the adsorbent is removed. The heat transfer fluid may be steam or other suitable fluid. The heat transfer fluid is supplied to tubes 65 from manifold 30 through conduits 29. Manifold 30 is supplied from an external source. Used heat transfer fluid is discharged from tubes 65 to manifold 32 through conduits 31. Wet contact material having vaporizable organic material thereon is introduced into drying zone 28 and onto one side of the upper surface of bed 78 as a gravitating stream by means of passages 68 at a level substantially below baffle 69. Dried granular contact material is removed from zone 28 at a level adjacent to the upper surface of bed 78 from the side of the bed opposite that to which contact material is supplied by means of weir 90 and passage 35. It will be noted that wet contact material is supplied to the surface of the bed in the drier and dried contact material is removed also from the surface of the bed. However, the wet contact material and dried contact material are supplied and removed respectively from opposite sides of the bed, thereby avoiding mixing of the two stream. An inert stripping gas, such as superheated steam or flue gas, is supplied to the lower section of bed 78 at a rate sufficient to bring about optimum heat transfer between tubes 65 and bed 78 by means of perforated pipes 34 which are supplied from manifold 33. Stripping gas passes upwardly through bed 78 and strips vaporized material from the contact material in bed 78. This stripping gas also acts in conjunction with the vaporized organic material from bed 78 to maintain the bed in a boiling condition. If preheated stripping gas is employed it may supply a portion of the heat required in the drier. If desired, however, a relatively cool gas such as flue gas at atmospheric temperature may be employed as a stripping fluid in less preferred forms of the invention. Stripping gas and vaporized material after disengagement from the upper surface of bed 78 passes upwardly as a single stream. Some adsorbent fines are normally entrained in this stream. This stream is subdivided momentarily into a plurality of horizontally spaced apart smaller streams uniformly spaced across the horizontal cross-section of the drying zone at a common level by passage through passages 70 in baffle plate 69. This momentary subdivision creates a significant pressure drop sufficient to promote a uniform withdrawal of the gasiform stream of stripping gas and vaporized material. These small streams are recombined above plate 69 into a single gasiform stream which is heated to a temperature sufficient to prevent condensation of the stripping gas and vaporized material in the gasiform stream by a suitable heating fluid circulated in indirect heat exchange relationship with said gasiform stream through tubes 71. This heating performs the important function of preventing condensation or "mudding" of the stripping gas, if condensible and the organic material on plate 69 and the upper end of the drier. Without this heating step this condensation would occur and liquid would drop back into bed 78 and disrupt the drying conditions therein. Some of the liquid would wet the dried adsorbent removed through weir 90 thereby defeating the entire purpose of the drying operation.

The stripping gas and vaporized material are then withdrawn through localized outlet 39 of substantially less cross-sectional area than the drying zone at a level above the subdivision and tubes 71. Tubes 71 are supplied with hot heat transfer fluid from manifold 30 by conduit 76 and discharge cooled heat transfer fluid into manifold 32 through conduit 77. Dried contact material flows over weir 90, the entry to which is laterally displaced from the discharge ends of conduits 68, and falls freely through duct 35. This is accomplished by withdrawing contact material at a rate controlled by orifice 79 above that at which contact material enters duct 35. The difference in flow rate is made up by returning contact material to combining zone 37 through conduit 51. Conduits 36, 51 and 64 are so arranged that conduit 64 preferentially draws contact material from conduit 36 rather than conduit 51. Conduit 51, however, is so placed that some flow always occurs through 51. This feature is described and claimed in U. S. patent application 278,059, filed March 22, 1952. A suitable inert purge gas such as flue gas is supplied to zone 37 via pipe 80 at a rate sufficient to maintain a slightly greater pressure in zone 37 than the pressure in the upper portion of drier 28. Most of this inert gas passes upwardly through duct 35 so as to strip solvent and water vapor from the effluent adsorbent. This purge gas is withdrawn through conduit 39. A small amount of purge gas passes downwardly through conduit 64 from chamber 37 and is vented to the boot of elevator 38 by means of conduit 80 above orifice 79. Thus the pressure is equalized across orifice 79 so that flow therethrough is not upset by pressure and gas flow fluctuations.

The dimensions of the several parts of the drying system will, of course, be dependent on the throughput desired and the type of material being dried. In general, the height of the drying vessel should be greater than its lateral dimensions. The drier should be sufficiently wide so that wet contact material entering through conduits 68 does not flow out through duct 35 before being dried.

Orifices or passageways 70 in plate 69 should be of such a size that the pressure drop across the orifices is substantially greater than the sum of the pressure drops due to flow from bed 78 to the orifices and from above the orifices to outlet 39. Thus, uniform withdrawal of gaseous material across the horizontal cross-section of 28 is accomplished. The temperature within bed 78 should be maintained at a level high enough to vaporize the organic material wetting the contact material. The temperature of the bed should be above 350° F. when the drier is operated at atmospheric pressure. In most operations, the temperature of the bed will not exceed 450° F. to avoid removing any liquid oil which may be still on the adsorbent and which would contaminate the recovered solvent. However, in some operations it may be desirable to utilize the drier as a preheater for the regenerator in which case the temperature may be as high as 700° F. The dried adsorbent should be passed from the drier to the regenerator under conditions of temperature and atmospheric moisture content such that the water content of the adsorbent remains below about 4.5% by weight. The drier may be operated at any desired pressure below or above atmospheric pressure, but the pressure is preferably maintained near or moderately in excess of atmospheric pressure. The superficial velocity of stripping gas through the drier should be such as will effect efficient transfer of heat from tubes 65 to bed 78. Heat transfer coils 71 should heat the outgoing gases to a temperature of at least 300° F. and preferably at least 400° F. to prevent condensation of the gases. The pressure drop through bed 78 should be from ¼ to ½ pound per square inch per foot of height.

As an example of a suitable drier constructed according to this invention, a drier used in a system for contacting liquid mineral oil with a granular adsorbent will be described. The drying vessel was 5 feet, 1¾ inches by 5 feet in lateral dimension and 10 feet, 10 inches high. The vessel was filled with heat transfer tubes 65 from a level 7¼ inches above the bottom to a level 6 feet, 5¼ inches above the bottom. The tubes were spaced 3 inches apart. There were 4 conduits 68 extending into the vessel a distance of 2 feet, 10 inches from the top. The top of weir 90 was 2 feet, 10 inches from the top of vessel 28 and the weir was 5 inches high. The weir extended the length of one of the 5 foot walls of 28. There were 8 perforated pipes 34, having 24 perforations of about ⅛ inch in diameter each. Baffle plate 69 was fixed about 6 inches from the top of vessel 28 and had about 70, 1¼ inch holes therethrough. Heat transfer tubes 71 were spaced about 2½ inches from the top of vessel 28. Conduit 39 was 6 inches in diameter.

The material dried in the drier was bauxite ranging in size from 15 to 30 mesh Tyler. Three tons per hour of this adsorbent on a dry basis were charged to vessel 28 through conduits 68. This adsorbent contained about 2200 pounds of petroleum naphtha per ton of adsorbent. The temperature of the bed 78 was maintained at about 400° F. by indirect heat exchange with 600 pounds of steam. Superheated steam of 400° F. and 18 p. s. i. was used as a stripping gas and was passed through the bed at a superficial velocity of one foot per second. The steam and solvent were reheated to 400° F. by tubes 71 before removal. Flue gas was used as a purge and admitted through conduit 80.

This invention should be understood to cover all changes and modifications of the example of the invention herein chosen for purposes of disclosure which do not constitute departures from the spirit and scope of the invention.

I claim:

1. An apparatus for continuously drying granular adsorbent having a vaporizable organic material deposited thereon, which comprises in combination: an enclosed drying chamber adapted to confine a bed of adsorbent in a state of ebullient motion which resembles a boiling fluid within its lower section, heat transfer tubes throughout the lower section of said chamber, means for circulating heating fluid continuously through said tubes whereby the temperature of said bed may be maintained at a level sufficient to effect vaporization of the vaporizable organic material, means for supplying inert stripping gas to the lower section of said chamber at a level below the top of said heat transfer tubes, members defining a plurality of short passageways for the flow of stripping gas and vaporized material at the same level in the upper section of said chamber and uniformly spaced apart with lower ends above said heat transfer tubes and upper ends below the upper end of said chamber, the size and number of said passageways being such as to provide a significant pressure drop sufficient to promote uniform withdrawal of stripping gas and vaporized material across the horizontal cross-section of said chamber, heat transfer tubes within the upper section of said chamber at a level above the upper ends of said passageways, means for circulating heating fluid through said last named tubes whereby the temperature of said tubes may be maintained at a level above the condensation temperature of the stripping gas and vaporized organic material, a conduit for the removal of stripping gas and vaporized organic material together extending from the upper section of said chamber at a level above said last named heat transfer tubes, means defining a passageway for the supply of adsorbent having vaporizable organic material thereon extending into said chamber and terminating at a level above said first named heat transfer tubes and substantially below said plurality of passageways, and means defining a passageway for the removal of dried adsorbent extending from said chamber at a level above said first named heat transfer tubes but substantially below said plurality of passageways, the point of entry to said removal passageway being laterally displaced from the point of discharge of said supply passageway.

2. An apparatus for continuously drying an adsorbent of palpable particulate form having non-vaporizable carbonaceous contaminants and vaporizable organic material deposited thereon which comprises in combination: an upright elongated drying vessel adapted to confine a bed of adsorbent in a state of ebullient motion which resembles a boiling fluid within its lower section, a plurality of uniformly spaced apart heat transfer tubes extending across said vessel from a level immediately above the bottom of said vessel to a level substantially below the upper end of said vessel, means for circulating heating fluid through said tubes whereby the temperature of said bed may be maintained at a level sufficient to effect vaporization of the vaporizable organic material on the adsorbent in said bed, a plurality of perforated pipes extending horizontally across said vessel at a level beneath said heat transfer tubes adapted to discharge superheated steam into the lower section of said vessel whereby said steam will flow upwardly through said bed to maintain it in a state of ebullient motion and strip vaporizable organic material from the adsorbent therein, means for supplying superheated steam to said pipes, a baffle plate extending horizontally across the upper section of said vessel at a level substantially above the said heat transfer tubes and having a plurality of uniformly spaced apart orifices therethrough, a plurality of spaced apart heat transfer tubes extending across the upper section of said vessel at a level above said baffle plate, means for circulating heating fluid through said last named heat transfer tubes whereby said tubes may be maintained at a temperature level above the condensation temperature of said steam and vaporized organic material, an outlet conduit for steam and vaporized organic material extending outwardly from the top of said vessel, at least one conduit for the supply of adsorbent having vaporizable organic material thereon extending into said vessel and terminating adjacent to one wall of said vessel at a level above said first named heat transfer tubes and substantially below said baffle plate, and means defining a passageway for the removal of dried adsorbent extending from said vessel, the entry to said passageway being adjacent to the wall of said vessel opposite the wall adjacent to said supply conduit and at a level above said first named heat transfer tubes and substantially below said baffle plate.

3. An apparatus for continuously drying adsorbent of palpable particulate form having a vaporizable organic material thereon which comprises in combination: an enclosed upright drying vessel, spaced apart heat transfer tubes throughout the lower section of said vessel, a plurality of supply conduits for wet adsorbent extending into said vessel and along one wall of said vessel to a level above said heat transfer tubes, means defining a discharge passageway for removing dried adsorbent from said vessel, having an entry at a level above said heat transfer tubes and adjacent to the wall of said vessel opposite the wall along which said plurality of supply conduits passes, a plurality of perforated pipes extending substantially horizontally across the lower section of said vessel below said heat transfer tubes, means for supplying superheated steam to said pipes, a baffle plate extending substantially horizontally across the upper section of said vessel at a level substantially above the lower ends of said supply conduits and said discharge passageway and having a plurality of spaced apart orifices therethrough, spaced apart heat transfer tubes within the upper section of said vessel above said baffle plate, a discharge conduit for steam and vaporized organic material extending from the top of said vessel, a heat transfer fluid charge manifold exterior to said vessel, at least one conduit for heat transfer fluid connecting said charge manifold and said first named heat transfer tubes, a conduit for heat transfer fluid connecting said last named heat transfer tubes and said charge manifold, a heat transfer fluid discharge manifold exterior to said vessel, at least one conduit for heat transfer fluid connecting said discharge manifold and said first named heat transfer tubes, a conduit for heat transfer fluid connecting said last named heat transfer tubes and said discharge manifold, means for supplying hot heat transfer fluid to said charge manifold and means for removing heat transfer fluid from said discharge manifold.

References Cited in the file of this patent

UNITED STATES PATENTS

| | | |
|---|---|---|
| 1,965,958 | Jonsson | July 10, 1934 |
| 2,384,932 | Lechthaler | Sept. 18, 1945 |
| 2,419,245 | Arveson | Apr. 22, 1947 |
| 2,444,990 | Hemminger | July 13, 1948 |
| 2,464,119 | Dawson | Mar. 8, 1949 |
| 2,513,369 | Shaw | July 4, 1950 |
| 2,536,099 | Schleicher | Jan. 2, 1951 |
| 2,629,938 | Montgomery | Mar. 3, 1953 |

FOREIGN PATENTS

| | | |
|---|---|---|
| 257,153 | Great Britain | Aug. 26, 1926 |